United States Patent
Goldberg et al.

(10) Patent No.: US 9,467,401 B1
(45) Date of Patent: Oct. 11, 2016

(54) ENABLING CONEXT AWARE EHANCEMENT FOR AUTOMATIC ELECTRONIC MAIL REPLY TO MITIGATE RISK

(71) Applicant: INTERNATIONAL BUSINESS MACHINES CORPORATION, Armonk, NY (US)

(72) Inventors: Itzhack Goldberg, Hadera (IL); Neil Sondhi, Pilisborosjeno (HU); Asima Silva, Holden, MA (US); Robert C. Weir, Dover, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/053,413

(22) Filed: Feb. 25, 2016

(51) Int. Cl.
G06F 15/16 (2006.01)
H04L 12/58 (2006.01)
H04L 29/06 (2006.01)
G06Q 10/10 (2012.01)

(52) U.S. Cl.
CPC .......... *H04L 51/02* (2013.01); *G06Q 10/107* (2013.01); *H04L 51/14* (2013.01); *H04L 63/1433* (2013.01); *H04L 63/1441* (2013.01)

(58) Field of Classification Search
CPC .................... H04L 51/14; G06Q 10/107
See application file for complete search history.

(56) References Cited

U.S. PATENT DOCUMENTS

| 6,941,466 B2 * | 9/2005 | Mastrianni .......... G06F 11/30 713/200 |
| 7,844,669 B1 | 11/2010 | Mohler |
| 2007/0192419 A1 | 8/2007 | Vuong et al. |

OTHER PUBLICATIONS

K. Moore, Recommendations for Automatic Responses to Electronic Mail, Aug. 1, 2004, IP.com, Internet Society.

* cited by examiner

*Primary Examiner* — Yves Dalencourt
(74) *Attorney, Agent, or Firm* — Patents on Demand P.A.; Brian K. Buchheit; Scott M. Garrett

(57) ABSTRACT

A current email addressed to an email address of a user account associated with a user can be received by an automated reply service with an automated reply enabled. The automated reply can include an automated reply notification. A current context of the current email can be compared to a previously established monitored reply history of the user to determine a normal reply to the email. A risk assessment can be applied to the default automated reply notification and the normal reply of the current email with weighting for current email aspects including urgency, recipients, sender, subject, and information in an automated reply notification. An action can be performed to the default automated reply notification based on the risk assessment.

1 Claim, 2 Drawing Sheets

ENABLING CONEXT AWARE EHANCEMENT FOR AUTOMATIC ELECTRONIC MAIL REPLY TO MITIGATE RISK

BACKGROUND

The present invention relates to the field of email security and, more particularly, to enabling context aware enhancement for automatic electronic mail reply to mitigate risk.

Out-of-office email reply messages in email applications allow the user to specify a message to be sent automatically in reply to incoming emails when the user is unable to reply. For example, when a user is attending a conference in a different state than the office they work in, they can enable an out-of-office reply to incoming emails they receive during their attendance. Typically the user specifies the dates of their absence, contact information in case of emergency, and co-workers and report chain. The current systems rely on the user to set the recipient list correctly, listing all those that may see this information and all those that may not. This provides an opportunity for error and sensitive information that should not be shared by others, especially those that are not employees.

In particular, out-of-office notification systems can be used by hackers interested in "spearfishing" since it allows them to gain access to relevant information regarding the organization, as well as contextual information. For example, an attacker can send an email a random employee's email (e.g., obtained from a company website) to trigger an out-of-office reply (e.g., "Joe is out on vacation and Sally is covering for him") which can be used to garner sensitive information. This kind of information can be used for social engineering to gain unauthorized access to company data and/or resources.

BRIEF SUMMARY

One aspect of the present invention can include a system, a computer program product and a method for enabling context aware enhancement for automatic electronic mail reply to mitigate risk. A current email addressed to an email address of a user account associated with a user can be received by an automated reply service with an automated reply enabled. The automated reply can include an automated reply notification. A current context of the current email can be compared to a previously established monitored reply history of the user to determine a normal reply to the email. A risk assessment can be applied to the default automated reply notification and the normal reply of the current email with weighting for current email aspects including urgency, recipients, sender, subject, and information in an automated reply notification. An action can be performed to the default automated reply notification based on the risk assessment.

Another aspect of the present invention can include a system, a computer program product and a method for enabling context aware enhancement for automatic electronic mail reply to mitigate risk. An engine for mitigating risk from an out-of-office reply by can modulate a default out-of-office setting associated with an email address of a user account associated with a user. The modulating can be performed utilizing a previously established historic behavioral context for the user based on a risk assessment of a received current email. A data store can persist at least one of the historic behavioral context and the current email triggering the out-of-office reply.

DETAILED DESCRIPTION

Figure 1:
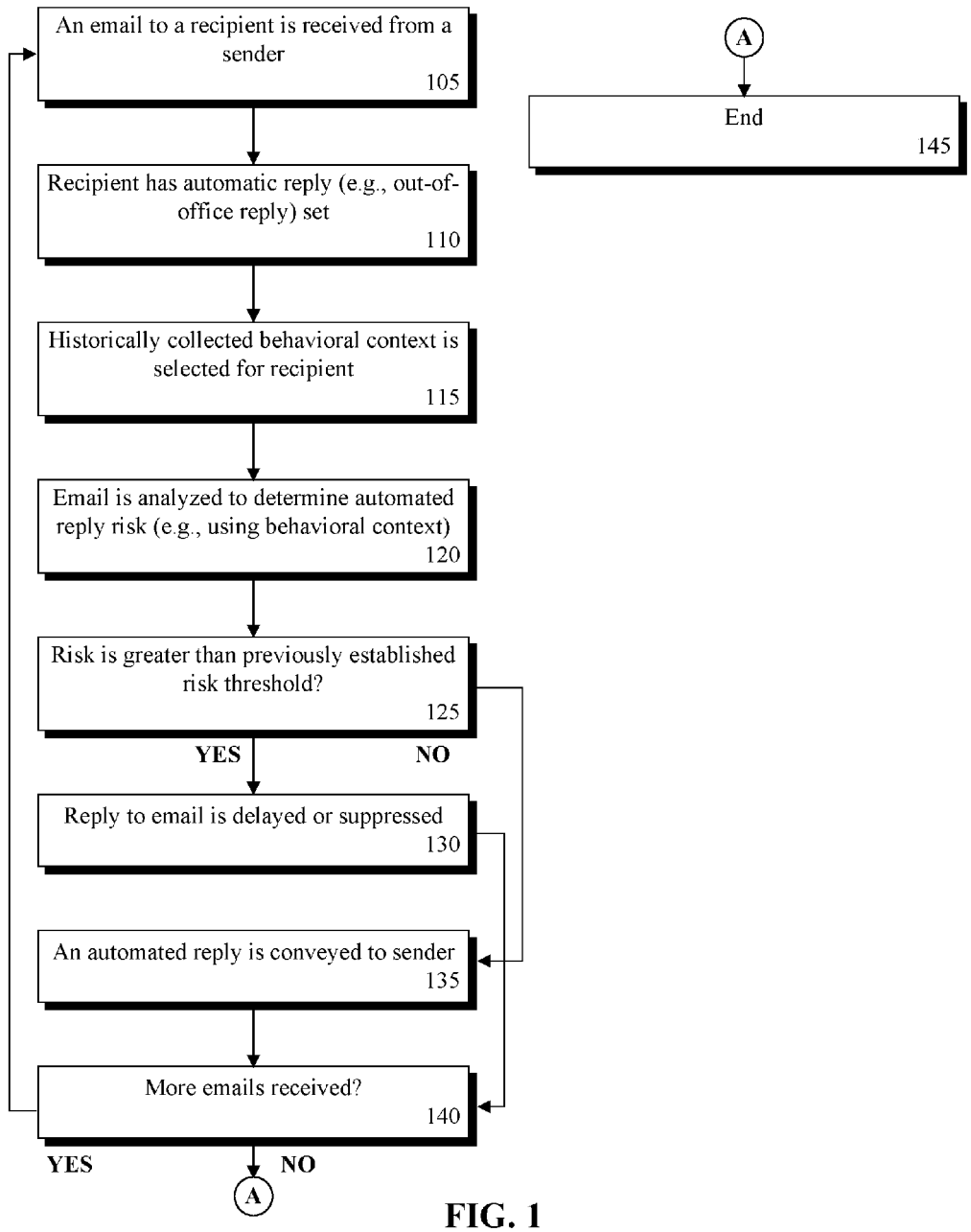
FIG. 1 is a flowchart illustrating a method for enabling context aware enhancement for automatic electronic mail reply to mitigate risk in accordance with an embodiment of the inventive arrangements disclosed herein.

The present disclosure is a solution for enabling context aware enhancement for automatic electronic mail (email) reply to mitigate risk. In the solution, a historic behavior context for a user email can be collected. For example, metrics associated with email frequency, reply delay, can be collected to establish a natural user behavior (e.g., baseline). When the user email account is configured to automatic reply (e.g., out-of-office reply) and an email is received, the solution can determine when an automatic reply (e.g., out-of-office reply) can be sent. In one embodiment, the email can be analyzed to determine a risk score with generating an automatic reply to the email. In the embodiment, when the risk score is evaluated against a previously established risk threshold, the outcome of the evaluation can determine a programmatic action that can be performed. In one instance, if the automatic reply generated from a historic context is useful to the sender (e.g., risk score is less than a risk threshold), the reply can be delivered. In another instance, if the automatic reply is likely unnecessary (e.g., risk score is greater than a risk threshold), the reply can be suppressed or delayed. For example, if an email was sent to a large distribution list and the recipient was cc'ed on the email, the out-of-office (OOO) reply would be of little or no value to the sender and the OOO reply can be suppressed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart illustrating a method for enabling context aware enhancement for automatic electronic mail reply to mitigate risk in accordance with an embodiment of the inventive arrangements disclosed herein. Method 100 can be performed in the context of system 200.

As used herein, an automatic reply can be a programmatically generated text exchange message responsive to an email receipt. It should be appreciated that automatic reply can include, but is not limited to, an out-of-office automated email, an automatic reply notification, and the like. Automatic reply can be enabled and/or disabled for an email account, a set of email accounts, and the like. In one instance, automatic reply can be an email message associated with an email address of a user account within a computing system. In one embodiment, automatic reply can be associated with settings, user preferences, historic behavioral context, a behavior baseline, and the like.

As used herein, email can be a text exchange message conveyed from a sender to a recipient. Email can include, but is not limited to, a header, a subject, a message body, a signature, a metadata, a timestamp, a message identifier and the like. In one instance, email can include, but is not limited to, a blind carbon copy address, a carbon copy address, and the like. It can be appreciated that email can include file attachments.

Historic correspondence can be one or more text exchange messages conveyed from the recipient to a sender. Correspondence can include, but is not limited to, a header, a subject, a message body, a signature, a metadata, a timestamp, a message identifier, and the like. In one instance, correspondence can include, but is not limited to, a blind carbon copy address, a carbon copy address, and the like. It can be appreciated that correspondence can include file attachments.

In method 100, an email conveyed from a sender to a recipient can be analyzed to determine an appropriate automatic reply. In one instance, the automatic reply can be appropriately sent and/or constructed based on a previously established recipient behavior baseline. In one instance, a previously established recipient behavior baseline can be a portion of a monitored context. In the instance, the monitored context can include, but is not limited to behavior metrics, usage patterns, and the like. Usage patterns and/or behavior metrics can include, but is not limited to, subject word selection, message body length, language usage, and the like. For example, the behavior metrics such as time to respond to an email and subject length can be collected from recipient emails over a period of weeks and a baseline for the recipient can be established. It should be appreciated that context can include metrics specific to a sender, a group of senders (e.g., distribution list), and the like.

In step 105, an email to a recipient can be received from a sender. In step 110, a recipient can have an automatic reply (e.g., out-of-office) set for their email account. It should be appreciated that automatic reply can be manually and/or automatically set. In one embodiment, automatic reply can be set via an email client utilized by the recipient. For example, an out-of-office assistant can be enabled within Microsoft Outlook to allow automated replies to the recipient's email address while the recipient is absent from their office. In step 115, historically collected behavioral context can be selected for the recipient. In one instance, behavioral context can be obtained from email client settings, email client interactions, email server message analysis, and the like. For example, historical behavioral context for a sender the recipient frequently communicates with can be captured from email client-server communication which can indicate the recipient always replies within an hour of receiving an email from the sender. In step 120, the email can be analyzed to determine automated reply risk using behavioral context. For example, based on historic email conversations a context for the email (and or an email conversation) can be determined and a risk assessment for replying to the email can be established. In one instance, a risk score can be established utilizing historic behavior, current context for the email, and the like. In the instance, one or more weighting factors can be applied to email attributes including, but not limited to, reply to sender frequency, reply length, subject heading, and the like. In one embodiment, email attributes can be evaluated (e.g., based on weighting factor) by a traditional and/or proprietary risk assessment algorithm to determine a risk score associated with the email. For example, a composite risk index can be computed for an email to determine a risk score and can be evaluated against a corporate wide risk threshold. It should be appreciated that risk score can be a numeric value, an alphanumeric value, and the like.

In step 125, if the risk score is greater than a previously established risk threshold, the method can continue to step 130, else continue to step 135. In step 130, an automated reply can be delayed or suppressed based on the risk score. In step 135, an automated reply can be conveyed to the sender. In one instance, the automated reply can conform to a previously established user setting (e.g., user established default out-of-office reply). In another instance, the automated reply can be modified to mitigate risk associated with disclosing sensitive information within the reply. For example, the name of a superior can be redacted from the reply to ensure social engineering attempts can be hindered. In step 140, if more emails are received, the method can return to step 105, else continue to step 145. In step 145, the method can end.

Drawings presented herein are for illustrative purposes only and should not be construed to limit the invention in any regard. It should be appreciated that method 100 can be performed in serial and/or in parallel. It should be understood that method 100 can be performed in real-time or near real-time.

Figure 2:
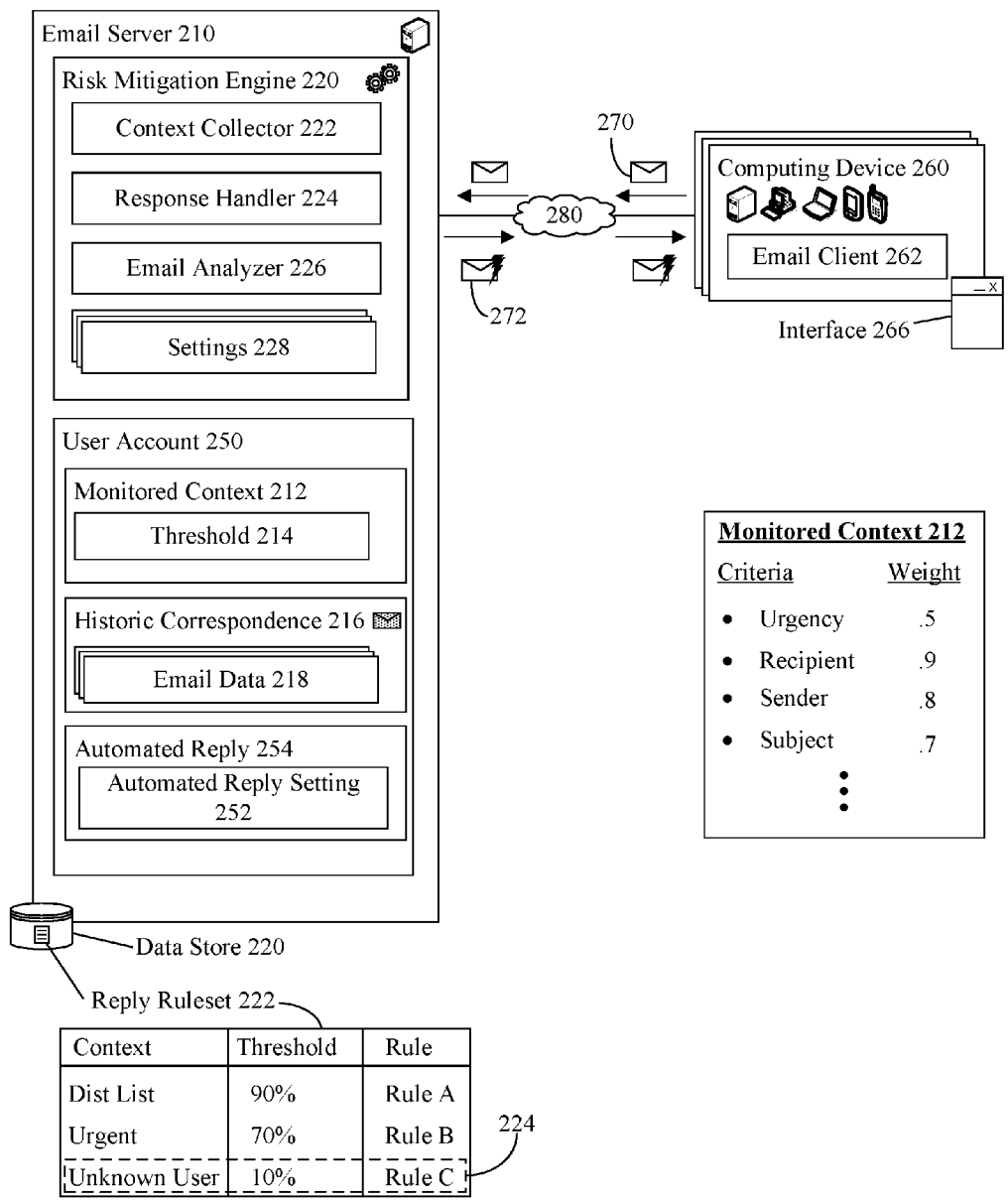
FIG. 2 is a schematic diagram illustrating a system for enabling context enhancement for aware automatic electronic mail reply to mitigate risk in accordance with an embodiment of the inventive arrangements disclosed herein.

FIG. 2 is a schematic diagram illustrating a system for enabling context aware enhancement for automated electronic mail reply to mitigate risk in accordance with an embodiment of the inventive arrangements disclosed herein. System 200 can be performed in the context of method 100.

In system 200, a risk mitigation engine 220 executing within an email server 210 can reduce automated reply social engineering attacks by intelligently responding to an email based on historic user behavior. Server 210, device 260, and/or system 200 components can be communicatively linked via one or more networks 280. In the system, an email 270 can be received by server 210. When an automated reply setting Email server 210 can be a hardware/software entity for executing risk mitigation engine 220. Server 210 can include, but is not limited to, engine 220, monitored context 212, historic correspondence 216, data store 220, and the like. Server 210 functionality can include, but is not limited to, encryption, load balancing, store and forward messaging, and the like. In one instance, email server 210 can be a component of a distributed computing network, a networked computing system, and the like.

Risk mitigation engine 220 can be a hardware/software element for reducing sensitive data exposure to unauthorized entities. Engine 220 can include, but is not limited to, context collector 222, reply handler 224, email analyzer 226, settings 228, and the like. Engine 220 functionality can include, but is not limited to, automatic reply settings parsing, address book parsing, and the like. It should be appreciated that engine 220 can utilize traditional and/or proprietary mechanisms to perform the functionality disclosed herein, including, but not limited to, keyword tagging, metadata analysis, pattern recognition, and the like. In one embodiment, engine 220 can be a functionality of an IBM Verse mail server, IBM Notes server, a Postfix mail server, a Qmail mail server, a Microsoft Exchange Mail server, and the like.

Context collector 222 can be a hardware/software entity for collecting historic behavior metrics and/or analyzing historic behavior metrics. Collector 222 functionality can include, but is not limited to, user account 250 selection, baseline generation, and the like. In one instance, collector 222 can be an Asynchronous JavaScript and Extensible Markup Language (AJAX) functionality. In the instance, collector 222 can garner metrics from user behavior and user usage patterns during email composition, during email submission, during email delivery, and the like. In one embodiment, collector 222 can be a functionality of a mail delivery module of an email server. In one instance, collector 222 can analyze a mailbox database associated with a user identity (e.g., email address). It should be appreciated that collector 222 can analyze incoming mail, outgoing mail, and the like.

Reply handler 224 can be a hardware/software element for generating an appropriate automated reply. Handler 224 functionality can include, but is not limited to reply generation, reply delay, reply suppression, and the like. In one instance, handler 224 can be utilized to redact one or more portions of an automated reply 254. In the instance, common keywords associated with risk scores greater than threshold 214 can be removed from reply 254 prior to submission. It should be appreciated that utilizing natural language processing, the reply 254 can be redacted while still maintaining readability and semantic context.

Email analyzer 226 can be a hardware/software entity for analyzing email 270 and/or email aspects Analyzer 226 functionality can include, but is not limited to, email analysis, email metadata analysis, and the like. In one instance, analyzer 226 can utilize traditional and/or proprietary algorithms to evaluate email 270. Algorithms can include, but is not limited to, natural language processing algorithms, Bayesian filter algorithms, and the like. It should be appreciated that email analyzer 226 can analyze incoming mail, outgoing mail, and the like. In one instance, analyzer 226 can evaluate multiple emails for similar patterns in subject, message body, sender, and the like. In the instance, the analyzer 226 can identify "spearfishing" attempts, spoofing attempts, phishing attempts, and the like.

Settings 228 can be one or more rulesets for establishing the behavior of server 210, engine 220, and/or system 200. Settings 228 can include, but is not limited to, context collector 222 options, reply handler 224 settings, email analyzer 326 parameters, and the like. In one instance, settings 228 can include, security policies options, natural language processing parameters, and the like. In one embodiment, setting 228 can be manually and/or automatically determined from historic settings, users preferences, system settings, and the like. In one instance, setting 228 can be configured via an interface communicatively linked to engine 220.

User account 250 can be a data set associated with a user identity of a user within a computing system. Account 250 can include, but is not limited to, monitored context 212, historic correspondence 216, automated reply 254, and the like. In one instance, account 250 can be associated with an email address associated with a user identity, user preferences, a mailbox (e.g., mailbox file), an addressbook, and the like. In one embodiment, mailbox can conform to a UNIX mbox database (e.g., maildir), a Microsoft Outlook post office file (e.g., .pst, .ost), an IBM Verse mail database, and the like.

Monitored context 212 can be a dataset for enabling risk mitigated automated reply. Context 212 can conform, but is not limited, an Extensible Markup Langauge (XML) format, a binary format, and the like. In one embodiment, context 212 can include a behavior baseline which can be a set of attributes and/or properties associated with an email authoring behavior of a user. Baseline can include, but is not limited to word selection metrics, word count metrics, character count metrics, and the like. In one embodiment, context 212 can include one or more criteria (e.g., urgency, recipient, subject), weighting values (e.g., 0.5, 0.9), and the like. That is, baseline can be generated from metrics associated with correspondence aspects such as subject, recipient urgency, and the like. It should be appreciated that criteria and weighting values can be arbitrarily defined. It should be appreciated that context 212 can include multiple baselines for a user, multiple baselines for multiple users, and the like. In one instance, context 212 can include a threshold 214 which can be manually and/or automatically established. In the instance, threshold 214 can conform to a numeric value, an alphanumeric value, and the like.

Historic correspondence 216 can be one or more data sets associated with an email address of a user identity. Correspondence 216 can conform to Hypertext Markup Language, Extensible Markup Language, and the like. In one instance, correspondence 216 can include email data 218 which can include file attachments, MIME type data, and the like.

Automated reply 254 can be an email response associated with an email address. Reply 254 can include a subject, a message body, a metadata, a file attachment, a signature, and the like. In one instance, automated reply 254 can include automated reply setting 252. In the instance, reply setting 252 can include, but is not limited to a duration, a sender address, a recipient address, and the like.

Data store 220 can be a hardware/software component able to persist user account 250, automated reply setting 252, reply ruleset 222, and the like. Data store 220 can be a Storage Area Network (SAN), Network Attached Storage (NAS), and the like. Data store 220 can conform to a relational database management system (RDBMS), object oriented database management system (OODBMS), and the like. Data store 220 can be communicatively linked to server 210 in one or more traditional and/or proprietary mechanisms. In one instance, data store 220 can be a component of Structured Query Language (SQL) complaint database.

Reply ruleset 222 can be a data set for configuring the behavior of engine 220 and/or components 222-226. Ruleset 222 can include, but is not limited to, a context identifier, a threshold value, a rule identifier, and the like. In one instance, ruleset 222 can be utilized to evaluate a current context of an email 270. For example, entry 224 can permit a received email (e.g., 270) from an unknown sender which can have a low risk threshold (e.g., 10%) to be evaluated against the email risk score; when the risk score exceeds 10%, an automated reply can be suppressed (e.g., Rule C). It should be appreciated that ruleset 222 can be manually and/or automatically established. In one instance, ruleset 222 can be presented within interface 266 and/or an interface communicatively linked with engine 220.

Computing device 260 can be a hardware/software permitting the execution of an email client to present email 270 and/or automated reply 272. Device 260 can include, but is not limited to, input/output components, interface 266, and the like. Computing device 260 can include, but is not limited to, a desktop computer, a laptop computer, a tablet computing device, a personal digital assistant (PDA), a mobile phone, and the like.

Interface 266 can be a user interactive component permitting interaction and/or presentation of email 270, automatic reply 272, and the like. Interface 266 can be present within the context of a Web browser application, a desktop email client application (e.g., client 262), a mobile email client application, and the like. In one embodiment, interface 266 can be a screen of an IBM Verse Web based email client application. Interface 266 capabilities can include a graphical user interface (GUI), voice user interface (VUI), mixed-mode interface, and the like. In one instance, interface 266 can be communicatively linked to computing device.

Network 280 can be an electrical and/or computer network connecting one or more system 200 components. Network 280 can include, but is not limited to, twisted pair cabling, optical fiber, coaxial cable, and the like. Network 280 can include any combination of wired and/or wireless components. Network 280 topologies can include, but is not limited to, bus, star, mesh, and the like. Network 280 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that one or more components within system 200 can be optional components permitting that the disclosure functionality be retained. It should be understood that engine 220 components can be optional components providing that engine 220 functionality is maintained. It should be appreciated that one or more components of engine 220 can be combined and/or separated based on functionality, usage, and the like. System 200 can conform to a Service Oriented Architecture (SOA), Representational State Transfer (REST) architecture, and the like.

It should be appreciated that the disclosure can utilize traditional and/or proprietary protocols including, but not limited to Simple Mail Transfer Protocol (SMTP), Internet Message Access Protocol (IMAP), and the like.

The flowchart and block diagrams in the FIGS. 1-2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for automatically responding to email based on a criterion comprising:

receiving, at a device comprising hardware and software, a current email addressed to an email address of a user account associated with a user by an automated reply service which enabled an automated reply, wherein the automated reply comprises an automated reply notification;

storing the current email in a non-transitory storage medium;

collecting behavioral context from the received current email;

comparing, at the device, a current context of the current email to a previously established historic behavioral context of the user to determine a normal reply to the email;

applying, at the device, a risk assessment to the automated reply notification and the normal reply of the current email with weighting for current email aspects comprising of at least one of urgency, recipients, sender, subject, and information in an automated reply notification;

responsive to applying the risk assessment, when the risk assessment is greater than a previously established risk threshold, delaying or suppressing an automated reply to a sender of the current email; and responsive to applying the risk assessment, when the risk assessment is not greater than the previously established risk threshold, conveying an automated reply to a sender of the current email.

* * * * *